3,354,727
GYROSCOPIC APPARATUS
Kurt Eichweber, Schutzenstrasse 77/79,
Hamburg, Altona, Germany
Filed Jan. 7, 1965, Ser. No. 423,956
Claims priority, application Germany, Nov. 17, 1964,
P 35,509
10 Claims. (Cl. 74—5.6)

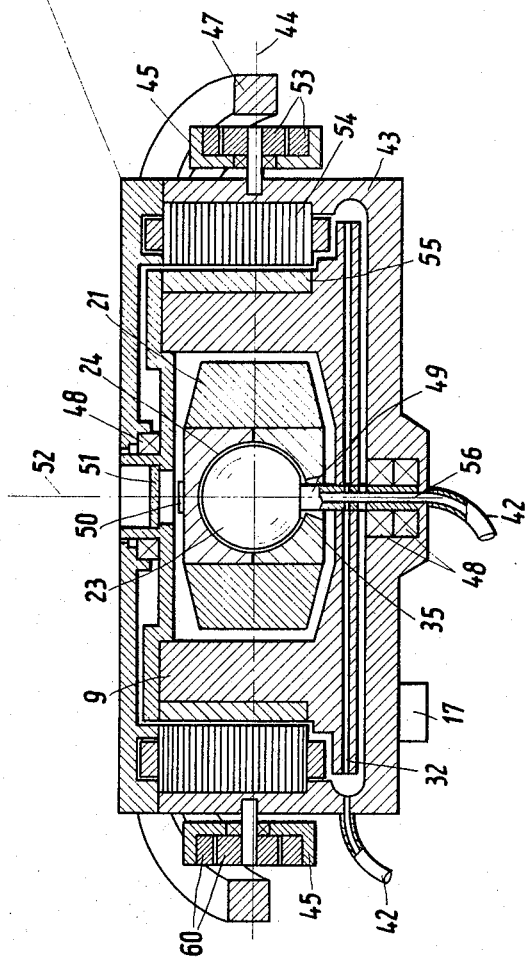

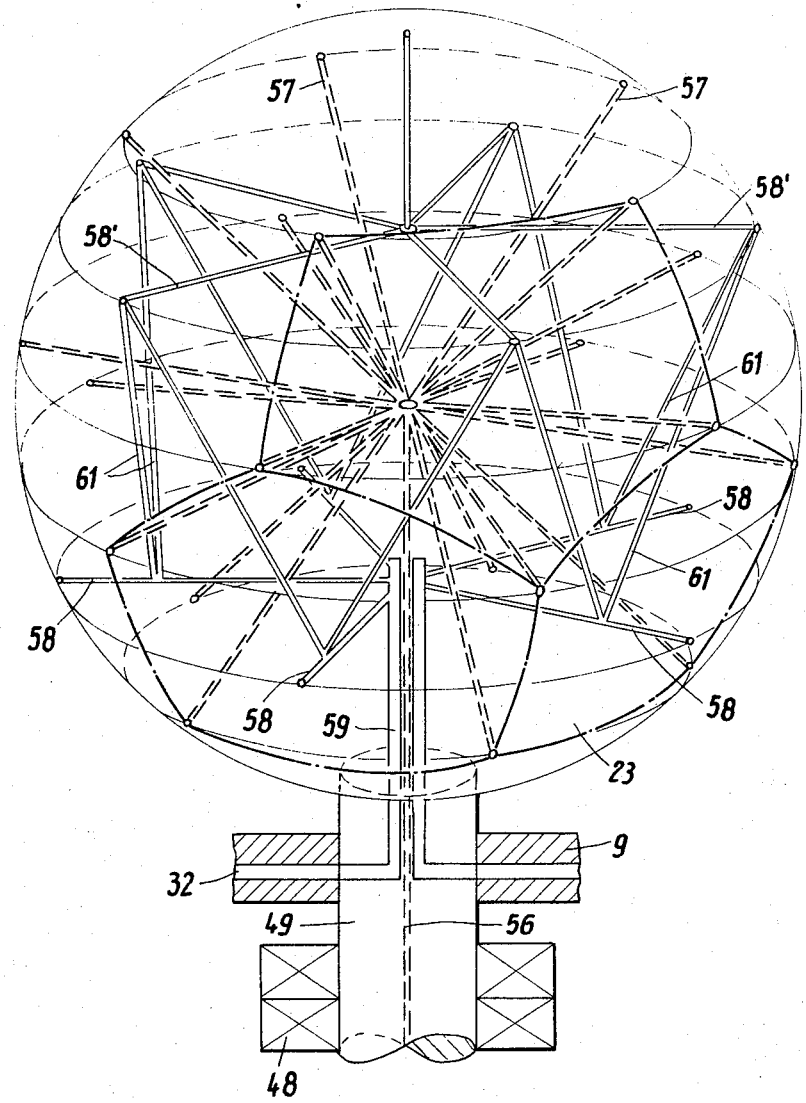

The invention relates to a gyroscopic apparatus, wherein an inner rotor serving as a sensing unit, for example for azimuth determination, is elastically journaled and coupled by means of a gas film in a rotatable housing formed as an outer rotor, the inner rotor having a structure that is symmetrical with the axis of rotation, with its mass concentrated in a concentric manner in the region of the equator of the rotor.

Gyroscopic devices which are installed for guidance and similar purposes are affected in their function by the oscillations and vibrations which occur in land vehicles, ships and aircraft as well as by unavoidable bearing friction. In order to overcome these difficulties, the platforms on which the gyroscopic apparatus is arranged have been provided heretofore with special stabilizing arrangements. However arrangements of this type are extraordinarily complicated, expensive and troublesome.

In order to eliminate these disadvantages, the applicant has developed heretofore a gyroscopic apparatus wherein an inner rotor serving as an azimuth sensor is elastically journaled and coupled by means of a gas film in an outer rotor. With this type of arrangement, the inner rotor, which may serve as a north- or west-seeking rotor or as a free (fixed in space) rotor, is effectively protected by the outer rotor against external disturbances. The inner rotor which is journaled on a gas film also is subjected to only very slight bearing friction. In this former gyroscopic apparatus the inner rotor was in the form of a sphere and it ran in a cavity in the outer rotor which was in the form of a hollow sphere.

The object of the invention then is to provide a further improvement in this former gyroscopic apparatus, in that the inner rotor which serves as sensor has its mass concentrated as much as possible in the region of its equator, i.e., it exhibits the highest possible torque and a high ratio between the equatorial and the polar moments of inertia, and thus is particularly insensitive to the disturbances which are already greatly attenuated by the outer rotor.

In accordance with the invention, these objects are accomplished by providing an inner rotor which is constructed in the form of a ring and which runs on a sphere or a spherical surface which is symmetrical with the axis of rotation.

Details of the invention are disclosed in the following description relating to the embodiments which are illustrated by way of example in the drawings, in which:

FIG. 4 is a section through a third embodiment of the invention; and

FIG. 5 is a diagrammatic view on an enlarged scale of a detail of FIG. 4.

Figure 1:
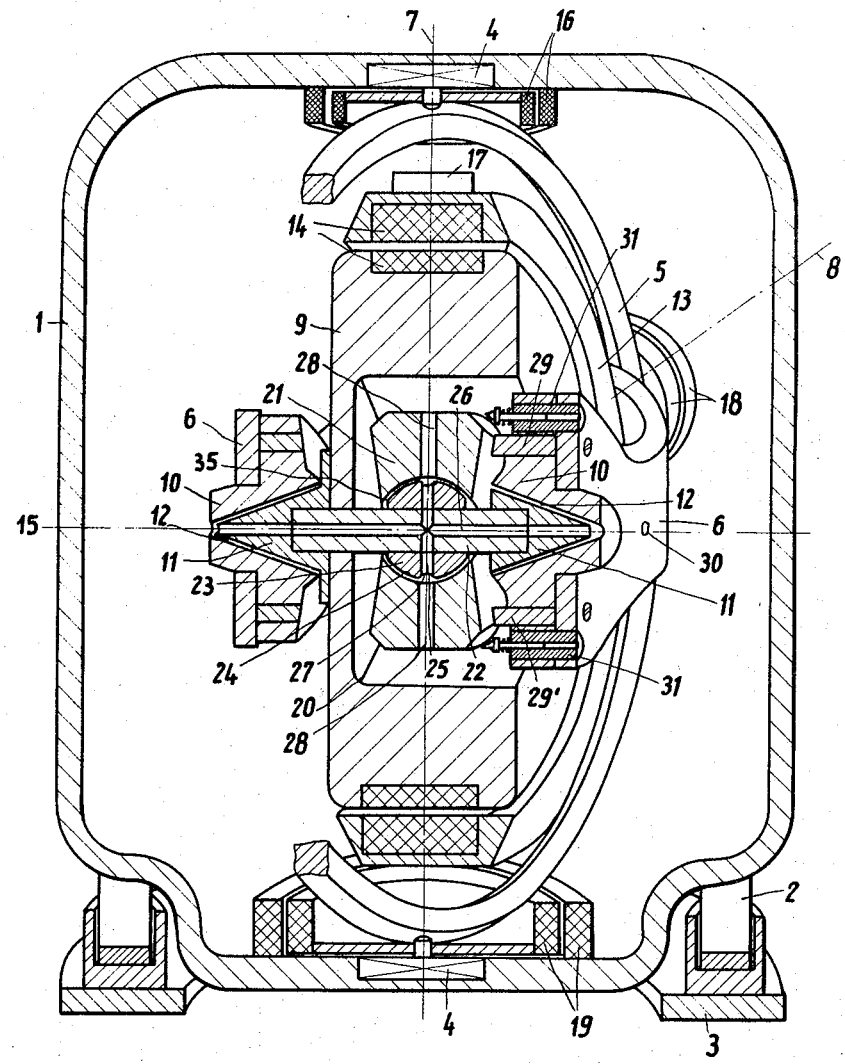
FIG. 1 is a section through a gyroscopic apparatus according to a first embodiment of the invention.

The gyroscopic apparatus according to FIG. 1 is provided with a support in the form of an outer housing 1, which is mounted by means of feet 2 on a supporting ring 3 and by means of this ring is installed for example in a vessel. In the housing 1 on bearings 4 is rotatably hung an outer Cardan ring 5, with which a frame in the form of an inner Cardan ring 6 is rotatably connected. The axis of rotation of the outer Cardan ring 5 is designated 7, and the axis of rotation of the inner Cardan ring 6 is designated 8. The inner Cardan ring 6 is thus mounted in gimbals in the outer housing 1.

An outer rotor 9 is mounted on trunnions in the inner Cardan ring 6. For this purpose the inner Cardan ring 6 carries two bearing members 10, which together with corresponding bearing members 11 of the outer rotor 9 define at each end a conical bearing clearance 12, which forms an aerodynamic gas bearing.

Fixed in the inner Cardan ring 6 is a ring-shaped frame 13 which surrounds the outer rotor 9. The frame 13 and the outer rotor 9 are provided with electromagnetic windings 14, by means of which the outer rotor 9 is driven. Parallel to the inner Cardan ring 6 and the rotor axis 15 is provided a positioning motor consisting of windings 16, of which the outer winding is connected with the housing 1 and the inner winding is connected with the Cardan ring 5. A turning moment on the outer Cardan ring 5 around the axis 7 results in the known manner, according to the arrangement of the rotors, in a turning moment of the rotor axis 15 around the axis 8. In like manner, for rotation of the outer rotor 9 around the axis 7, is provided a positioning motor 18 which applies a turning moment to the inner Cardan ring 6. At the floor of the housing 7 is further provided a locator consisting of the windings 19 for electrical correction of the existing course.

The outer rotor 9 is provided with a central ring-shaped cavity 20, which serves to receive an inner rotor 21. On the central axle 22 of the outer rotor 9 is secured a bearing member 23 which has a spherical surface, forming a spherical portion of the central axle, and on which is supported, by the viscosity of the gas flowing through a bearing clearance 24, the inner rotor 21, which is provided with an innerwall in the form of a spherical cavity.

The bearing member 23 is provided with radially extending passages 25, which are connected to axially extending gas supply passages 26 and which discharge into a circumferential groove 27. The inner rotor 21 also is provided with radially extending passages 28.

The gyroscopic apparatus further comprises, for sensing the deviation of the axis of rotation of the outer rotor 9 from that of the inner rotor 21, inductive, capacitive or photoelectric sensing elements 29, 29' and 30, 30' (30' not being shown) which are arranged opposite to one another in pairs. The pair of sensing elements 30, 30' lie behind and in front of the sectional plane (FIG. 1) in horizontal alignment.

Arresting magnets 31 are fastened on the frame 6 and can fix the inner rotor 21 with respect to the frame 6. The operation of the gyroscopic apparatus according to FIG. 1 is as follows:

When the outer rotor 9 is placed in rotation by energizing the windings 14 and when the inner rotor 21 is simultaneously held stationary with respect to the frame 6 in a suitable manner, for example by means of the arresting magnets 31, there is created in the bearing clearance 24, by reason of the shape of the cavities, an aerodynamic flow of gas which forms a bearing between the bearing member 23 and the inner rotor 21. Then when the arresting magnets 31 are deenergized, the inner rotor 21 is placed in rotation by reason of the viscosity of the gas in the bearing clearance 24, and the inner rotor 21, with its passages 28, then operates as a centrifugal pump to draw gas through the passages 25 and 26. The energy required to produce this pumping action is transferred by means of the gas in the bearing clearance 24 to the inner rotor 21. Therefore the inner rotor 21 rotates more slowly than the outer rotor 9 and the bearing member 23. This difference in speed of rotation maintains the aerodynamic bearing effect in the cavity which forms the bearing clearance 24.

If the windings 14 are capable of supplying sufficient power to place the outer rotor 9 in rotation very quickly, so that the inner rotor 21 because of its inertia overcomes the static friction on the bearing member 23, thus creating the aerodynamic gas bearing in the bearing clearance 24, the arresting magnets 31 are not necessary.

The gyroscopic apparatus according to FIG. 1 can be used as a free (fixed in space) or as a north-seeking gyroscope.

When installed as a free gyroscope, the operation of the gyroscopic apparatus is as follows:

The sensing elements 29 and 29' are connected with the positioning motor 16 and the sensing elements 30 and 30' are connected with the positioning motor 18. A deviation of the axis of the outer rotor 9 from the axis of the inner rotor 21 is corrected by the sensing elements 29 and 29', 30 and 30', which operate by means of the positioning motors 16 and 18 to make use of the resulting precession of the outer rotor 9.

If on the other hand the axle 22 of the outer rotor 9 is maintained horizontal by the gravitational vertical sensor 17 and the positioning motor 16, the inner rotor 21, which rotates on the bearing clearance 24 with exceedingly slight friction, is north-seeking in the sense of a Foucault gyroscope. It is very well stabilized and protected by the outer rotor 9 against outer disturbances which may arise from oscillations or vibrations. If the axle 22 of the outer rotor 9 deviates from the axis of rotation of the inner rotor 21, a signal is transmitted from the sensing elements 29, 29' or 30, 30' to the positioning motor 16 or the positioning motor 18, so that the axle 22 of the outer rotor 9 is again brought into correspondence with the axis of the inner rotor 21.

Figure 2:
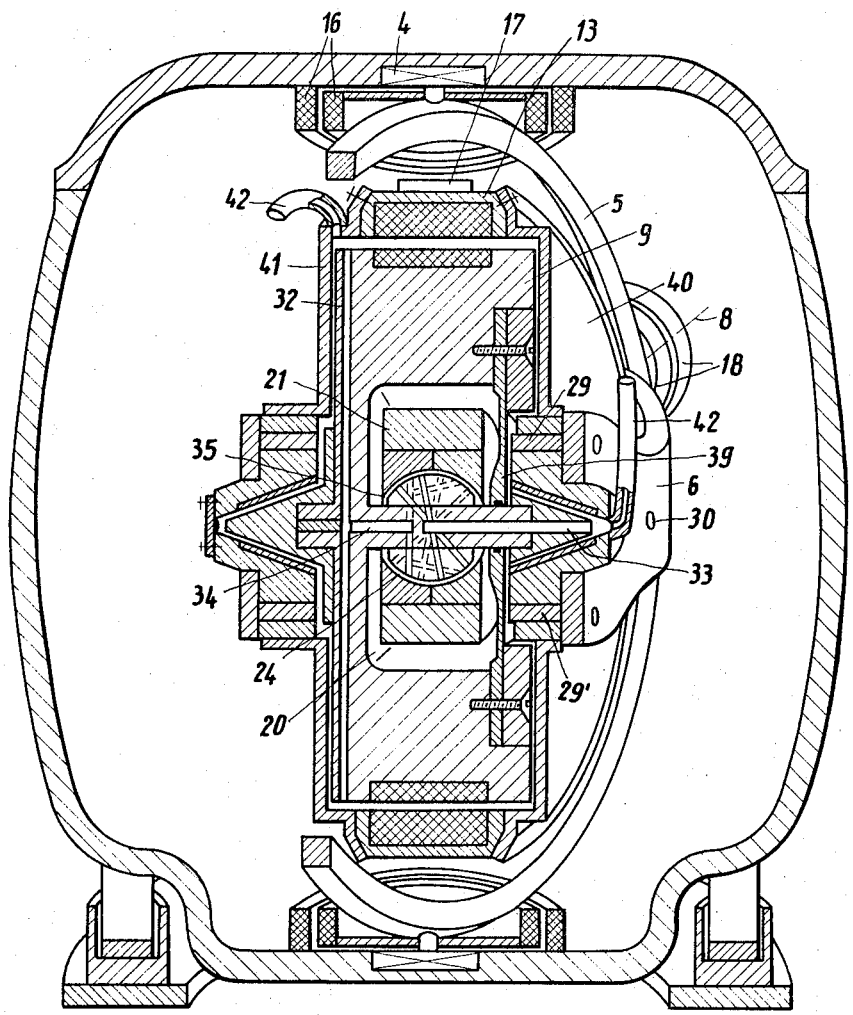
FIG. 2 is a corresponding section through a second embodiment.
Figure 3:
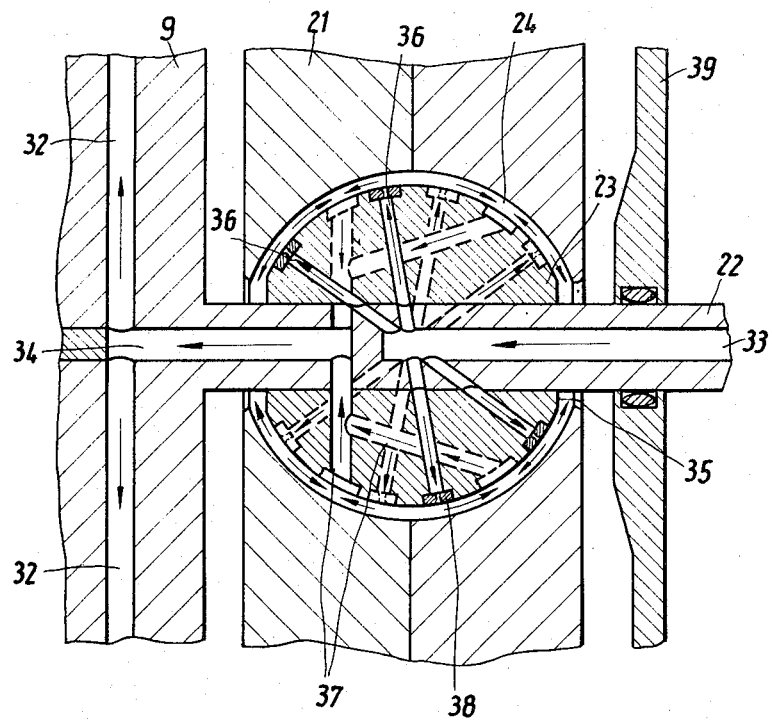
FIG. 3 is a detail of FIG. 2 on an enlarged scale.

The embodiment illustrated in FIGS. 2 and 3 differs from the arrangement according to FIG. 1 essentially only in that there is another form of gas supply. The outer rotor 9 is here provided with radially extending passages 32, while the inner rotor 21 contains no passages. The central axle 22 of the outer rotor is, as seen particularly in FIG. 3, provided with an axially extending inlet 33, as well as a similarly axially extending outlet 34 which discharges into the radial passages 32. The bearing member 23 which has a spherical surface is provided with flattened portions 35 which are adjacent the axle and which extend inwardly of the inner rotor 21, and also is provided with a number of supply passages 36 and discharge passages 37. The supply passages 36 discharge into the bearing clearance 24 through nozzle-like stones 38. The arrangement and distribution of the passages 36, 37 will be explained in detail in connection with FIG. 5.

The circular cavity 20 in the outer rotor 9 which contains the inner rotor 21 is closed gas tight from the exterior by means of a packing disc 39. In the embodiment according to FIG. 2, the frame 13 which is connected with the inner Cardan ring 6 is furnished on each side with a plate 40 or 41. A tube 42, only part of which is shown in the drawing, leads from the outer portion of the chamber formed by the plates 40, 41 and the frame 13 (approximately opposite to the discharge openings of the passages 32) through a booster pump (not illustrated) to the inlet opening of the gas inlet passage 33.

The flow of the gas in the gyroscopic apparatus according to FIGS. 2 and 3 is as follows:

The gas driven outward by the passages 32, which operate as a centrifugal pump, flows by way of a booster pump through the supply tube 42 to the axially extending inlet passage 33, then by way of the supply passages 36 reaches the bearing clearance 24, and then leaves this bearing clearance through the discharge passages 37 and again reaches the passages 32 by way of the outlet 34 (see FIG. 3).

The discharge openings of the supply passages 36 lie, as will be further explained in detail by means of FIG. 5, at the corners of a regular dodecahedron having pentagonal faces, while the inlet openings of the discharge passages 37 lie at the centers of the individual pentagonal faces. An aerostatic gas bearing is formed in the bearing clearance 24.

Operation of the gyroscopic apparatus according to FIGS. 2 and 3 otherwise corresponds to that of the embodiment according to FIG. 1.

FIGS. 4 and 5 illustrate a further embodiment of the gyroscopic apparatus according to the invention, which may be applied for example as a free (fixed in space) gyroscope for steering a rocket. The housing 43 is rotatably mounted on the axis 44 in a ring 45 which is rotatably mounted on the axis 46 in an outer ring 47.

In the housing 43 the outer rotor 9 is journaled on bearings 48, and is fixed to an axle 49. This axle 49 carries a central spherical bearing member 23, on which the circular inner rotor 21 is journaled and coupled by means of a gas bearing formed in the bearing clearance 24. The center of the bearing member 23 is exactly at the point of intersection of the axes 44 and 46. The inner rotor 21 in this embodiment carries on its upper side a mirror 50, upon which strikes a beam of light which is transmitted by a condensing lens 51. The reflection of this beam of light, or the signal from another, for example capacitive or inductive, sensing device detects the deviation of the axis of rotation of the inner rotor 21 from the axis of rotation 52 of the outer rotor 9. The signal thus obtained is transmitted to a positioning motor 53 on the axis 44 or a positioning motor 53' on the axis 46 to bring the outer rotor 9 again to the axis of rotation of the inner rotor 21. The driving of the outer rotor 9 is obtained by a stator 54 and a rotor 55 concentric with the axle 49. A sensor 60 on the axis 44 and a sensor 60' on the axis 46 serve to detect the position of the outer rotor 9. The positioning motor 53' and the sensor 60' which are located on the axis 46 are not shown in the drawings.

A different function of the apparatus according to FIG. 4 may be achieved if the gravitational vertical sensor 17 controls the positioning motors 53 and 53'. The outer rotor 9 then operates as a horizontal rotor and stabilizes the housing 43, the control of which may suitable be embodied in a Schuler-tuned system. As a result of the rotation of the earth, an angle forms between the axis of the outer rotor 9 and the axis of rotation of the inner rotor 21, because the inner rotor 21 lags behind as the rotation of the earth causes the outer rotor 9 to swing around the north-south axis. The inner rotor 21 is thus turned toward the west with respect to the housing 43 and shows the characteristics of a west-seeking gyro-compass.

The outer rotor 9, instead of being stabilized by means of gravitational vertical sensor, can be stabilized with respect to the center of the earth by a known type of control apparatus.

The outer rotor 9 also in the embodiment according to FIG. 4 is provided with radially extending passages 32, which operate as a centrifugal pump. In the central axle 49 there is also an axial supply passage 56.

The connection of the radially extending passages 32 as well as the supply passage 56 with the passages provided in the bearing member 23, as well as their arrangement, is shown in detail in the schematic drawing of FIG. 5. The spherical bearing member 23 is provided with a total of twenty passages 57 which extend radially outward in a star-like formation from the center, and which are shown in dotted lines in the drawing. The outlets of these supply passages 57 lie at the corners of a regular dodecahedron having pentagonal faces. Three five-sided faces are illustrated in FIG. 5 with dash and dot lines. At the center of symmetry of each pentagonal face is the inlet opening of a gas discharge passage 58 and 58', through which the gas, after flowing through the bearing clearance 24 (partly by way of connecting bores 61) is led into axially extending outlet passages 59, through which the gas reaches the radial passages 32.

As indicated in FIG. 5, the arrangement of the discharge openings is symmetrical with the center of the spherical bearing member 23, and each pentagonal group of discharge openings also provides a symmetrical self-contained pattern of gas flow, because the five supply passages of each pentagonal group lie at the corners and the corresponding discharge passage 58 lies at the center of the pentagon.

The supporting of the inner rotor 21 on a bearing clearance which is supplied with gas in this manner is distinguished by the fact that it provides particularly high precision and prevents any moment from being applied to the inner rotor 21 by reason of asymmetrical supply of gas upon deviation of the axes of rotation of the outer rotor 9 and the inner rotor 21.

Having described the invention, I claim:

1. Gyroscope apparatus comprising a support, a frame mounted on gimbals in the support, and an outer rotor mounted in the frame on trunnions the axis of which is perpendicular to the axis on which the frame is pivoted, wherein the improvement comprises a symmetrical annular inner rotor, having its mass concentrated adjacent to its equator, and having a spherical inner wall; the outer rotor having a central cavity and having fixed therein a central axle having a spherical portion which, with the spherical inner wall of the inner rotor, forms a gas bearing for supporting and entraining the inner rotor.

2. Gyroscopic apparatus according to claim 1 wherein the spherical portion of the central axle has flats adjacent to its axis and the inner rotor lies outside of such flats.

3. Gyroscopic apparatus according to claim 1 wherein the center of the spherical portion of the central axle lies at the point of intersection of the axes of the gimbals.

4. Gyroscopic apparatus according to claim 1 wherein the spherical portion of the central axle has an axial gas supply passage and a circumferential groove, and contains radial passages leading from the supply passage to the groove, for pumping gas centrifugally to the groove, and the inner rotor has radial passages which are normally in alignment with such groove, for pumping gas centrifugally from the region of the groove.

5. Gyroscopic apparatus according to claim 4 wherein the spherical portion of the central axle has an axial gas supply passage and a separate axial gas discharge passage and contains passages leading to the exterior of the spherical portion, some of which are connected to the supply passage and others of which are connected to the discharge passage, and the outer rotor has radial passages connected to the discharge passage, for pumping gas centrifugally from the discharge passage.

6. Gyroscopic apparatus according to claim 5 wherein the supply and discharge passages in the spherical portion of the central axle are concentric with one another.

7. Gyroscopic apparatus according to claim 5 wherein the outlets of the individual gas supply passages at the exterior of the spherical portion of the central axle lie at the corners of a regular dodecahedron, while the inlets of the individual gas discharge passages lie at the centers of symmetry of the individual pentagonal sides of such dodecahedron, and the individual discharge passages are connected by bores.

8. Gyroscopic apparatus according to claim 5 wherein the inner rotor is located in a central cavity of the outer rotor which is sealed gas tight by a packing disc.

9. Gyroscopic apparatus according to claim 1, comprising a gravitational vertical sensor for maintaining the axis of the outer rotor horizontal so that the inner rotor is north-seeking.

10. Gyroscopic apparatus according to claim 1 wherein the outer rotor is provided with a control for maintaining its axis vertical, and there is arranged on the inner rotor a mirror by means of which the resulting tilting of the inner rotor toward the west provides an indication of direction.

References Cited

UNITED STATES PATENTS

| | | | |
|---|---|---|---|
| 1,890,831 | 12/1932 | Smyth | 74—5 |
| 3,226,982 | 1/1966 | Betts | 74—5.6 |
| 3,263,507 | 8/1966 | Appleton | 74—5 |

MILTON KAUFMAN, *Primary Examiner.*

FRED C. MATTERN, *Examiner.*

F. E. BAKER, *Assistant Examiner.*